Patented Nov. 23, 1943

2,334,872

UNITED STATES PATENT OFFICE 2,334,872

CATALYTIC CONVERSION OF HYDROCARBONS

Gerhard Free and Wilhelm v. Fuener, Ludwigshafen-on-the-Rhine, Germany; vested in the Alien Property Custodian No Drawing. Application March 22, 1941, Serial No. 384,740. In France August 8, 1938

13 Claims. (Cl. 196—53)

The present invention relates to a process for the production of hydrocarbons from carbonaceous substances, in particular for the destructive hydrogenation of hydrocarbon oils.

This application is a continuation-in-part of our application Ser. No. 288,582, filed August 5, 1939.

We have found that in the production of hydrocarbons from carbonaceous substances, in particular in the destructive hydrogenation of carbonaceous materials, such as coals, tars and mineral oils, under elevated pressure, it is advantageous to use a catalyst containing silicic acid, obtained from a silica sol, and at least one compound of a polyvalent metal, in the preparation of which the sol from which the hydrogel is formed has a hydrogen ion concentration lying between pH=4 and 7, preferably between pH=4 and 6.5, during the formation of the hydrogel. Especially good catalytic actions are obtained when the sol has a pH value between 4 and 6, especially between 4.5 and 5.5. In the preparation of the catalyst, the liquid from which the gel is formed must have the said hydrogen ion concentration throughout the whole duration of the gel formation.

The catalyst may for example be prepared as follows:

A waterglass solution is converted by the addition of electrolytes into a sol with the necessary hydrogen ion concentration and then mixed with a solution of salt or with solutions of two or more salts of metals of the 2nd to the 8th groups of the periodic system. There may be mentioned for example the salts of the following metals: alkaline earth metals, aluminum, magnesium, zinc, tin, lead, titanium, molybdenum, tungsten, chromium, vanadium, iron, cobalt or nickel. If no satisfactory precipitation takes place, there may be simultaneously or subsequently added to the sol, advantageously before the completion of the gel formation, an alkaline or neutral precipitant, as for example caustic alkali solutions or sodium or ammonium acetate solutions, more preferably a solution of ammonia, ammonium carbonate or ammonium sulphide. The added substances should however be used only in such amounts that the pH value of the mixture remains between 4 and 7. The precipitant may also be added to the sol before the addition of the metal salt solution and the latter mixed for example with the water-containing gel. The mixture is then heated in order to remove the moisture wholly or for the most part. For example the mixture may be evaporated to dryness and heated for example to temperatures between 300° and 800° C.

The mixture of water-containing gel and metal compound may also be evaporated at about 100° C., filtered before drying, the residue washed for the removal of the salts causing the precipitation of the gel, then dried and heated to from 300° to 800° C.

The catalyst may also be prepared by bringing the waterglass solution together with the metal salt solution without the formation of gel having first occurred. This is effected by ensuring that the mixture contains sufficient acid in excess. For example there may be added to an alkaline or acid silicate solution an acid or neutral solution of salts, as for example of aluminum and/or iron, as for example the nitrates, sulphates or chlorides of these metals, the solutions being so adjusted to each other that an excess of acid is present after mixing. It is advisable to allow the alkaline or neutral solution to flow into the acid solution. After standing for a long time the sol solidifies with the formation of the gel. The formation of the gel may be accelerated by heating the solution. The gel is then washed free from acid to a great extent and heated to high temperatures.

During washing it is advantageous to impart to the washing water at the start the same hydrogen ion concentration as that of the liquid from which the gel has been formed.

It is not essential to add the metal compound during the preparation of the silica gel, but it may also be incorporated with the finished gel, for example by impregnating the latter with a metal salt solution.

The proportion of gel in the catalyst should preferably amount to from 30 to 75 per cent. If the catalyst contains, apart from other metal components, $SiO_2$ and $Al_2O_3$, the ratio of $SiO_2:Al_2O_3$ should preferably be less than about 75:25.

The catalyst may also be shaped with carbonaceous substances, such as graphite, and then exposed to high temperatures, as for example from 500° to 800° C.

A small amount of boric acid, as for example from 0.2 to 10 per cent, may also be incorporated with the catalyst during its preparation, as for example before, during or after the heating.

In many cases it is also desirable to dissolve out again from the catalyst part of the introduced metal compounds, as for example with inorganic or organic acids. The dissolving out of the metal compounds may be carried out while the mass is still moist, i. e., before a strong heating has taken place. The resulting product is then washed out well, dried and heated.

It is especially advantageous to provide a catalyst, for example containing aluminum and/or magnesium, with one or more heavy metal compounds, in particular sulphides, as for example molybdenum sulphide, tungsten sulphide, nickel sulphide and/or iron sulphide.

The catalyst is eminently suitable for the destructive hydrogenation of coals, tars and mineral oils, extraction products of coals, cracking products of hydrocarbon oils, oils consisting mainly of hydrocarbons prepared from carbon monoxide and hydrogen, or fractions of these substances, especially middle oils.

The destructive hydrogenation of coals, tars and mineral oils is carried out at pressures above 20 atmospheres, preferably above 250 atmospheres, as for example at from 300 to 700 or 1000 atmospheres. The catalysts to be employed at above 250 atmospheres, in particular above 300 atmospheres, advantageously may only contain silica, alumina and/or magnesia but no other strong hydrogenating metal compounds, whereas metal compounds having a weak hydrogenating action, for example the oxides or sulphides of zinc or manganese, may be present. On the other hand the catalysts to be employed with pressures of from 20 to 300, more particularly from 50 to 250, atmospheres, advantageously may contain also heavy metal sulphides, especially sulphides of molybdenum, tungsten, iron, nickel and cobalt.

The following examples will further illustrate how the said invention may be carried out in practice but the invention is not restricted to these examples.

*Example 1*

650 grams of a waterglass solution containing 26 per cent of $SiO_2$ are diluted with water to 3 liters and acidified with 160 cubic centimeters of concentrated hydrochloric acid. This solution is adjusted to a pH value of from 5.5 to 6.0 by the addition of ammonia, stirred and there is then added, while continuously stirring, a solution of 680 grams of aluminum nitrate $(Al(NO_3)_3.9H_2O)$ in 2 liters of water. The acid thus set free is continuously neutralized with such an amount of ammonia that the pH of from 5.5 to 6.0 is maintained during the precipitation. The precipitate is filtered, washed first with acidified water (pH=5.5 to 6.0) and then with pure water, dried and heated to from 450° to 500° C.

The catalyst is then used in the destructive hydrogenation of a paraffin base gas oil boiling between 210° and 350° C. under a hydrogen pressure of 600 atmospheres at 410° C. with a throughput of 2 kilograms per liter of catalyst per hour. The product obtained contains 65 per cent of gasoline with an octane number of 75.

*Example 2*

1.3 liters of waterglass solution containing 26 per cent of $SiO_2$ are diluted with 10 liters of water and 430 cubic centimeters of concentrated hydrochloric acid are added. 3.95 kilograms of aluminum nitrate $(Al(NO_3)_3.9H_2O)$, 60 grams of iron chloride $(FeCl_3.6H_2O)$ and 18 grams of magnesium nitrate $(Mg(NO_3)_2.6H_2O)$ dissolved in 10 liters of water are added to this solution. The clear sol thus prepared and a 20 per cent ammonia solution are allowed to flow while stirring vigorously into 3 liters of water which has been adjusted to the desired pH value of 5.5 by the addition of ammonia, the manner in which the sol and the ammonia solution are allowed to flow in being such that in the liquid in which the precipitate is formed the said pH value, measured with an antimony electrode, is maintained. The precipitate is filtered off, washed free from chlorine with water adjusted to a pH value of 5.5 and dried. The resulting catalyst is impregnated with ammonium thiotungstate dissolved in ammonium sulphide solution in such an amount that the finished catalyst contains 10 per cent of tungsten disulphide. The catalyst is then dried, heated at from 400° to 420° C. in a current of hydrogen and shaped.

If a mixed base petroleum middle oil be led over this catalyst at 410° C. and with a hydrogen pressure of 250 atmospheres, a product containing 60 per cent of benzine and having an octane number of 77 is obtained in a 90 per cent yield.

What we claim is:

1. A process for the production of hydrocarbon oils by destructive hydrogenation of carbonaceous materials under elevated pressure and at a temperature of from 300° to 700° C., which comprises using a catalyst containing silicic acid, obtained from a silicic acid sol, and at least one compound of a polyvalent metal, in the preparation of which catalyst the sol from which the silica hydrogel is formed has a hydrogen ion concentration between pH=4 and pH=6.5 throughout the whole duration of the hydrogel formation.

2. A process as claimed in claim 1, in which during the preparation of the catalyst during the mixing of the silicic acid sol with the metal salt solution an alkaline-reacting precipitant is added in such amounts that a pH value of the mixture of between 4 and 6.5 is maintained throughout the whole duration of the hydrogel formation.

3. A process as claimed in claim 1, in which during the preparation of the catalyst during the mixing of the silicic acid sol with the metal salt solution an ammoniacal precipitant is added in such amounts that a pH value of the mixture of between 4 and 6.5 is maintained throughout the whole duration of the hydrogel formation.

4. A process as claimed in claim 1, in which during the preparation of the catalyst after the mixing of the silicic acid sol with the metal salt solution an alkaline-reacting precipitant is added in such amounts that a pH value of the mixture of between 4 and 6.5 is maintained throughout the whole duration of the hydrogel formation.

5. A process as claimed in claim 1, in which during the preparation of the catalyst after the mixing of the silicic acid sol with the metal salt solution an ammoniacal precipitant is added in such amounts that a pH value of the mixture of between 4 and 6.5 is maintained throughout the whole duration of the hydrogel formation.

6. A process as claimed in claim 1, in which during the preparation of the catalyst after the mixing of the silicic acid sol with the metal salt solution an alkaline precipitant is added in such amounts that a pH value of the mixture of between 4 and 6.5 is maintained throughout the whole duration of the hydrogel formation.

7. A process as claimed in claim 1, in which during the preparation of the catalyst at the latest after the beginning but before the completion of the gel formation an ammoniacal precipitant is added in such amounts that a pH value of between 4 and 6.5 is maintained throughout the whole duration of the hydrogel formation.

8. A process for the production of hydrocarbon oils by destructive hydrogenation of carbonaceous materials under high pressure and at a temperature of from 300° to 700° C., which comprises using a catalyst containing silicic acid, obtained from a silicic acid sol, and at least two compounds of at least two different polyvalent metals, in the preparation of which catalyst the sol from which the silicic acid hydrogel is formed has a hydrogen ion concentration between pH=4 and pH=6.5 throughout the whole duration of the hydrogel formation.

9. A process for the production of hydrocarbon oils by destructive hydrogenation of carbonaceous materials under pressure above 250 atmospheres and at a temperature of from 300° to 700° C., which comprises using a catalyst containing silicic acid, obtained from a silicic acid sol and alumina, in the preparation of which catalyst the sol from which the silicic acid hydrogel is formed has a hydrogen ion concentration between pH=4 and pH=6.5 throughout the whole duration of the hydrogel formation.

10. A process for the production of hydrocarbon oils by destructive hydrogenation of carbonaceous materials under pressure above 250 atmospheres and at a temperature of from 300° to 700° C., which comprises using a catalyst containing silicic acid, obtained from a silicic acid sol and magnesia, in the preparation of which catalyst the sol from which the silicic acid hydrogel is formed has a hydrogen ion concentration between pH=4 and pH=6.5 throughout the whole duration of the hydrogel formation.

11. A process for the production of hydrocarbon oils by destructive hydrogenation of carbonaceous materials at pressures between 20 and 300 atmospheres and at a temperature of from 300° to 700° C., which comprises using a catalyst containing silicic acid, obtained from a silicic acid sol, and alumina and at least one heavy metal sulphide, in the preparation of which catalyst the sol from which the silicic acid hydrogel is formed has a hydrogen ion concentration between pH=4 and pH=6.5 throughout the whole duration of the hydrogel formation.

12. A process for the production of hydrocarbon oils by destructive hydrogenation of carbonaceous materials at pressures between 20 and 300 atmospheres and at a temperature of from 300° to 700° C., which comprises using a catalyst containing silicic acid, obtained from a silicic acid sol and magnesia and at least one heavy metal sulphide, in the preparation of which catalyst the sol from which the silicic acid hydrogel is formed has a hydrogen ion concentration between pH=4 and pH=6.5 throughout the whole duration of the hydrogel formation.

13. A process for the production of hydrocarbon oils by destructive hydrogenation of carbonaceous materials under pressure above 250 atmospheres and at a temperature of from 300° to 700° C., which comprises using a catalyst containing silicic acid, obtained from a silicic acid sol and alumina, in the preparation of which catalyst the sol from which the silicic acid hydrogel is formed has a hydrogen ion concentration between pH=4 and pH=6 throughout the whole duration of the hydrogel formation.

GERHARD FREE.
WILHELM V. FUENER.